No. 634,881. Patented Oct. 17, 1899.
T. R. DALLMEYER.
PHOTOGRAPHIC CAMERA.
(Application filed July 15, 1899.)

(No Model.) 3 Sheets—Sheet 1.

Witnesses.
E. A. Balloch
Walter Reeves Jabbs.

Inventor.
Thomas R. Dallmeyer,
By his Attorneys,
Baldwin Davidson & Wright

No. 634,881. Patented Oct. 17, 1899.
T. R. DALLMEYER.
PHOTOGRAPHIC CAMERA.
(Application filed July 15, 1899.)

(No Model.) 3 Sheets—Sheet 2.

Witnesses.
E. A Balloch,
Walter Reves Tubbs.

Inventor.
Thomas R. Dallmeyer,
By his Attorneys
Baldwin Davidson & Wight.

No. 634,881. Patented Oct. 17, 1899.
T. R. DALLMEYER.
PHOTOGRAPHIC CAMERA.
(Application filed July 15, 1899.)

(No Model.) 3 Sheets—Sheet 3.

UNITED STATES PATENT OFFICE.

THOMAS R. DALLMEYER, OF LONDON, ENGLAND.

PHOTOGRAPHIC CAMERA.

SPECIFICATION forming part of Letters Patent No. 634,881, dated October 17, 1899.

Application filed July 15, 1899. Serial No. 723,946. (No model.)

*To all whom it may concern:*

Be it known that I, THOMAS RUDOLPHUS DALLMEYER, optician, a subject of the Queen of Great Britain, residing at 25 Newman street, Oxford street, London, in the county of Middlesex, England, have invented a certain new and useful Photographic Camera, of which the following is a specification.

This invention relates to cameras for successively taking a number of similar views, such as are used in color photography. For this purpose I employ a movable mirror for successively diverting the beam of light from the lens to a number of sensitive plates. I employ a mirror fixed at an angle of forty-five degrees to a shaft coaxial with the lens, so that by turning the shaft the image is successively directed onto plates at the sides of the camera.

Figure 1:
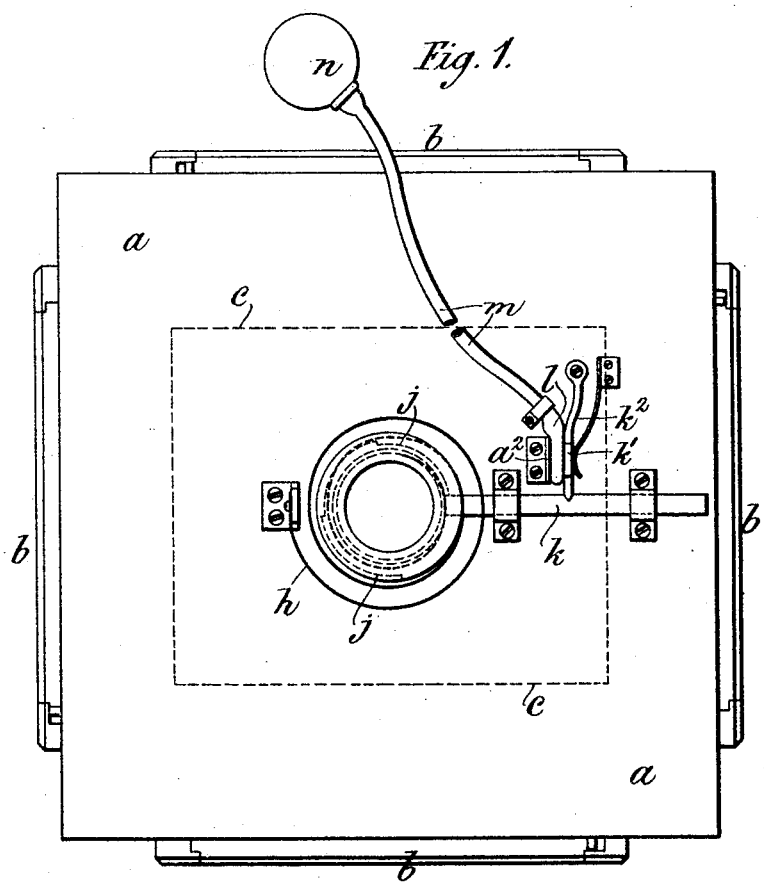
Figure 2:
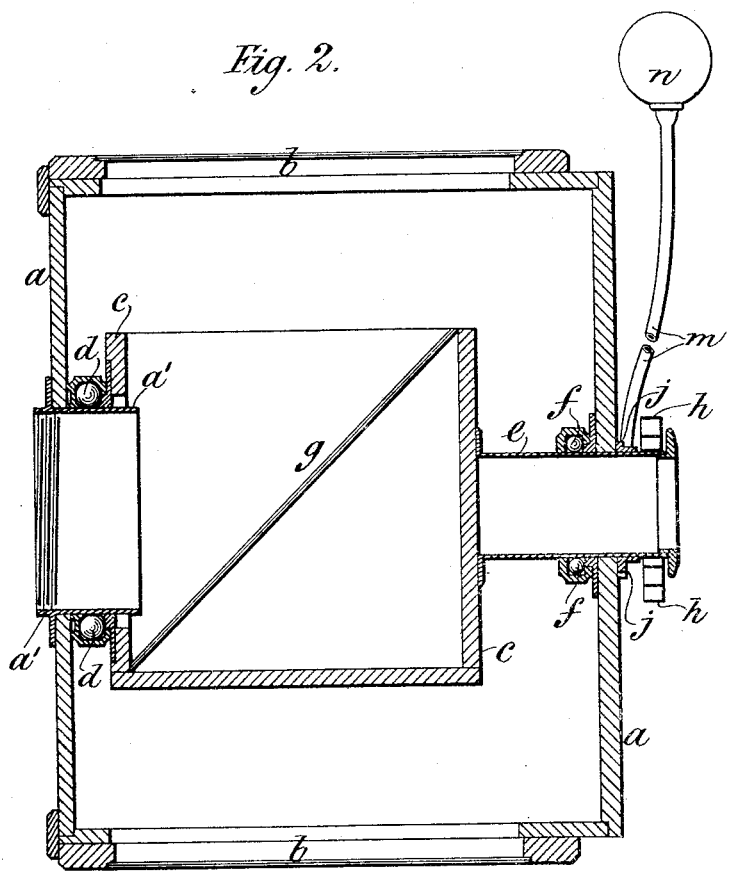
Figure 3:
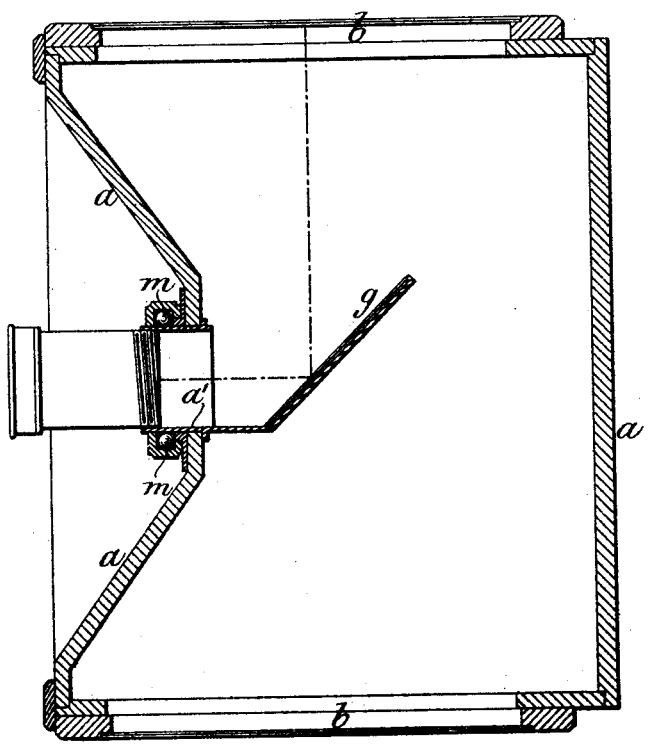

Figure 1 is a back elevation, and Fig. 2 a longitudinal section, of the apparatus. Fig. 3 is a longitudinal section of a modification.

In Figs. 1 and 2, $a$ are the walls of the camera. $a'$ is a tube fixed to the camera and which carries the lens. $b\ b$ are four plate-holders sliding in grooves in the ordinary manner, but placed at the four sides of the camera instead of at the back, as is usual. $c$ is a frame the front of which revolves on the ring of balls $d$, surrounding the tube $a'$, and the back carries the shaft $e$, which revolves in the ball-bearing $f$. $g$ is a mirror fixed to the frame $c$. $h$ is a spring having one end fixed to the shaft $e$ and the other to the camera. $j$ is a four-toothed ratchet or cam wheel fixed to the shaft $e$, and $k$ is a bolt engaging with it. The teeth of the ratchet are shown as arranged at different distances from the center, and I prefer this arrangement. $l$ is a flexible ball placed between a lug $a^2$ on the camera and a lug $k'$ on a lever $k^2$, operating the bolt $k$. The ball $l$ is connected by the tube $m$ to a second flexible ball $n$. By squeezing the latter the ball $l$ is expanded, the bolt $k$ is withdrawn, and the frame $c$ and mirror $g$ are revolved through a quadrant by the spring $h$ and are then again arrested by the bolt $k$ engaging with the next tooth of the ratchet-wheel $j$. This forms a very convenient arrangement for manipulating the mirror, but any other suitable device may be employed. The ball is only squeezed momentarily just sufficiently to make the bolt clear the tooth and is then released, the spring $k'$ causing the bolt to catch the next tooth. The bolt is squeezed each time the mirror is to be rotated.

In Fig. 3 the frame $c$ is dispensed with, the mirror $g$ being fixed to the tube $a'$, which in this case is free to revolve in the ball-bearing $m$ and constitutes a hollow shaft carrying the mirror. By this arrangement a smaller mirror is required. In this figure the means for rotating the mirror are not shown. They may be the same as in Figs. 1 and 2; but the mirror may be rotated by hand by simply rotating the tube $a'$.

I claim—

1. In a camera, the combination of a mirror free to revolve about the axial line of the lens-tube, and making an angle of forty-five degrees to it, with plate-holders at the sides of the camera.

2. In a camera, the combination of a mirror free to revolve about the axial line of the lens-tube and making an angle of forty-five degrees to it, means for revolving the mirror, and plate-holders at the sides of the camera.

3. In a camera, the combination of a shaft, a mirror fixed to the shaft and making an angle of forty-five degrees to the axis of the lens-tube, plate-holders at the sides of the camera, a spiral spring having one end fixed to the camera and the other to the shaft, a ratchet-wheel fixed to the shaft and a bolt engaging with the ratchet-wheel.

THOMAS R. DALLMEYER.

Witnesses:
ROBERT B. RANSFORD,
JOHN H. WHITEHEAD.